(12) United States Patent
Latif et al.

(10) Patent No.: US 12,407,610 B1
(45) Date of Patent: Sep. 2, 2025

(54) ROUTING PROTOCOL PROCESSING INTERMEDIARIES FOR CLOUD COMPUTING ENVIRONMENTS

(71) Applicant: Amazon Technologies, Inc., Seattle, WA (US)

(72) Inventors: Ammar Latif, Jupiter, FL (US); Mathew Wolfgang Walter Lehwess, San Francisco, CA (US); Young Ha Jung, Frisco, TX (US); Christian Joseph Martin, Rumson, NJ (US); Ishwardutt Parulkar, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 874 days.

(21) Appl. No.: 17/548,391

(22) Filed: Dec. 10, 2021

(51) Int. Cl.
*H04L 45/02* (2022.01)
*H04L 45/586* (2022.01)

(52) U.S. Cl.
CPC ............ *H04L 45/02* (2013.01); *H04L 45/586* (2013.01)

(58) Field of Classification Search
None
See application file for complete search history.

(56) References Cited

U.S. PATENT DOCUMENTS

| | | |
|---|---|---|
| 8,539,079 B2 | 9/2013 | Thireault |
| 9,125,047 B2 | 9/2015 | Sundaresan et al. |
| 9,703,660 B2 | 7/2017 | Cillis et al. |
| 9,838,268 B1 | 12/2017 | Mattson |
| 9,876,851 B2 | 1/2018 | Chandramouli et al. |
| 10,064,242 B2 | 8/2018 | Pawar et al. |
| 10,135,702 B2 | 11/2018 | Lahiri |
| 10,244,507 B2 | 3/2019 | Tarlazzi et al. |
| 10,257,105 B2 | 4/2019 | Majmundar et al. |
| 10,419,550 B2 | 9/2019 | Nainar et al. |
| 10,581,717 B2 | 3/2020 | Tejaprakash et al. |
| 10,594,456 B2 | 3/2020 | Park et al. |
| 10,608,734 B2 | 3/2020 | Barbieri et al. |
| 10,705,808 B2 | 7/2020 | Chiosi et al. |
| 10,749,721 B2 | 8/2020 | Fertonani et al. |
| 10,750,514 B2 | 8/2020 | Fujinami |
| 10,817,409 B2 | 10/2020 | Zeng et al. |

(Continued)

FOREIGN PATENT DOCUMENTS

WO 2014073949 A1 5/2014

OTHER PUBLICATIONS

U.S. Appl. No. 17/807,341, filed Jun. 16, 2022, Upendra Bhalchandra Shevade et al.

(Continued)

*Primary Examiner* — Mohammad S Adhami
(74) *Attorney, Agent, or Firm* — Robert C. Kowert; Kowert, Hood, Munyon, Rankin & Goetzel, P.C.

(57) ABSTRACT

A dynamic routing information exchange protocol session is established between a protocol processing intermediary and an application pipeline function executor running at a virtualized computing service. During the session, the intermediary receives a message indicating reachability information of a pipeline function implemented by the executor, and causes an entry indicating the executor as a destination to be stored in a route table of the service. After the entry is stored, a request for the application function is directed to the executor using the entry.

20 Claims, 9 Drawing Sheets

(56) References Cited

U.S. PATENT DOCUMENTS

| | | | |
|---|---|---|---|
| 10,880,173 | B2 | 12/2020 | Seenappa et al. |
| 10,891,140 | B1 | 1/2021 | Levin |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,539,582 | B1 | 12/2022 | Gupta et al. |
| 11,552,842 | B2 | 1/2023 | Barabell |
| 11,720,425 | B1 | 8/2023 | Yang |
| 11,743,117 | B2 | 8/2023 | Gupta |
| 11,800,404 | B1 | 10/2023 | Yang |
| 11,824,943 | B1 | 11/2023 | Krasilnikov et al. |
| 11,916,999 | B1 | 2/2024 | Gupta |
| 11,937,103 | B1 | 3/2024 | Krasilnikov |
| 11,985,065 | B2 | 5/2024 | Shevade et al. |
| 2012/0127151 | A1 | 5/2012 | Murakami |
| 2017/0054628 | A1* | 2/2017 | Tomotaki ............ H04L 12/4633 |
| 2017/0264587 | A1* | 9/2017 | Ju ............................ H04L 12/12 |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0289497 | A1 | 9/2019 | Rajagopal |
| 2019/0391855 | A1 | 12/2019 | Bernat et al. |
| 2019/0394826 | A1 | 12/2019 | Wang et al. |
| 2020/0028758 | A1* | 1/2020 | Tollet ...................... H04L 67/10 |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2021/0297383 | A1* | 9/2021 | Bagwell ................. H04L 43/20 |
| 2022/0030117 | A1 | 1/2022 | Young et al. |
| 2022/0046084 | A1 | 2/2022 | Nair |
| 2022/0070734 | A1 | 3/2022 | Rajagopal |
| 2022/0279421 | A1* | 9/2022 | Sivakumar .......... H04W 40/248 |
| 2022/0377615 | A1 | 11/2022 | Radunovic |
| 2023/0325266 | A1 | 10/2023 | Yang |
| 2023/0409362 | A1 | 12/2023 | Shevade |
| 2023/0409363 | A1 | 12/2023 | Shevade |
| 2024/0031908 | A1* | 1/2024 | Grewal ................... H04L 45/38 |
| 2024/0040002 | A1 | 2/2024 | Krasilnikov et al. |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |

OTHER PUBLICATIONS

U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/326,218, filed May 20, 2021, Ximeng Simon Yang, et al.
U.S. Appl. No. 17/364,779, filed Jun. 30, 2021 Diwakar Gupta et al.
U.S. Appl. No. 17/364,788, filed Jun. 30, 2021, Diwakar Gupta et al.
U.S. Appl. No. 17/364,789, filed Jun. 30, 2021, Diwakar Gupta et al.
U.S. Appl. No. 17/364,791, filed Jun. 30, 2021, Diwakar Gupta et al.
U.S. Appl. No. 17/326,221, filed May 20, 2021, Ximeng Simon Yang, et al.
U.S. Appl. No. 17/461,785, filed Aug. 30, 2021, Diwakar Gupta et al.
U.S. Appl. No. 18/630,891, filed Apr. 9, 2024, Shevade, et al.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
Unknown, "5G; NG-RAN; Architecture Description", Technical Specification, ETSI TS 138 401, Version 16.8.0, Release 16, Jan. 2022, pp. 1-82.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/808,518, filed Jun. 23, 2022, Ozgur Dural.
U.S. Appl. No. 17/820,542, filed Aug. 17, 2022, Nikolay Kirschenmann, et al.
U.S. Appl. No. 17/810,319, filed Jun. 30, 2022, Julius Mueller, at al.
U.S. Appl. No. 17/809,864, filed Jun. 29, 2022, Nikolay Kirschenmann, et al.
U.S. Appl. No. 17/710,571, filed Mar. 31, 2022 Manjari Asawa, et al.
U.S. Appl. No. 18/146,126, filed Dec. 23, 2022, Diwakar Gupta.
U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

* cited by examiner

ROUTING PROTOCOL PROCESSING INTERMEDIARIES FOR CLOUD COMPUTING ENVIRONMENTS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. As 5G technology becomes more prevalent, new types of broadband-based applications are likely to be developed and deployed, with some parts of the technology stack being executed using resources at cloud computing environments.

Figure 1:
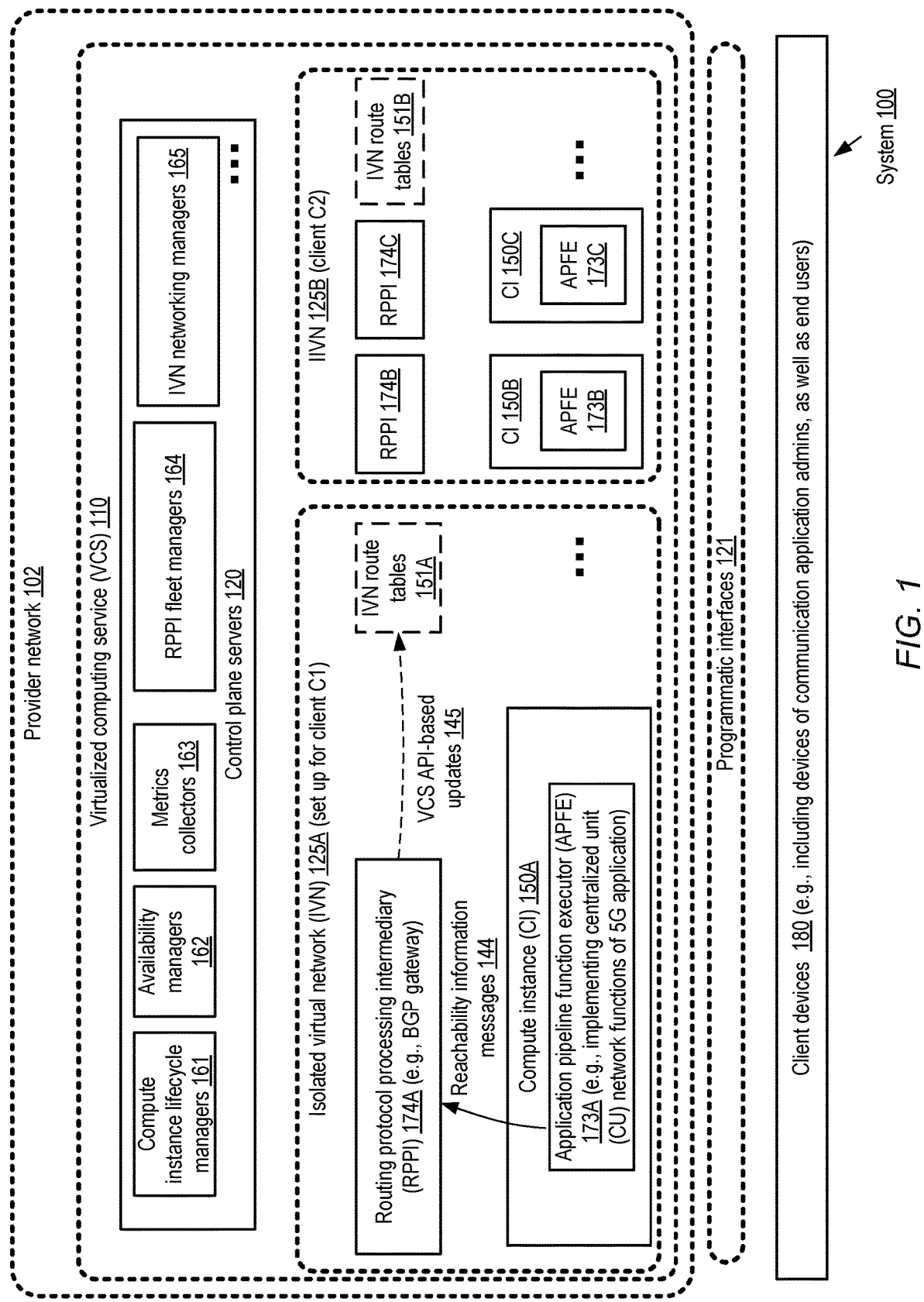
FIG. 1 illustrates an example system environment in which routing protocol processing intermediaries may be configured for communication application pipeline components executed using provider network resources, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for enabling modification of routing information within virtualized computing services of cloud computing environments using dynamic routing information exchange protocols. Virtualized computing services (VCSs) of some provider networks or cloud computing environments often implement a set of application programming interfaces (APIs) which are invoked in order to modify route table entries. Such APIs are typically invoked relatively infrequently, e.g., via easy-to-use web-based consoles by administrators of applications being run using VCS resources, and can require parameters representing provider network-specific logical constructs such as virtual network interfaces (VNIs). In contrast, components of many telecommunication application pipelines (such as applications using fifth-generation or 5G broadband cellular technology), which have traditionally been run without using provider network resources, typically utilize a different model for managing routing information. Such application components frequently transmit sequences of messages formatted according to industry standard dynamic routing information exchange protocols such as various versions of BGP (Border Gateway Protocol) to propagate reachability information, with protocol processing engines responsible for analyzing the contents of the messages to determine the best next hops for traffic intended for the components. The routing information exchange messages of the dynamic routing information exchange protocols tend not to include any provider-network-specific parameters such as VNI identifiers.

Owners or designers of such telecommunication applications (as well as other non-telecommunication applications which may use dynamic routing information exchange protocols) may wish to migrate various components of the applications to VCS resources in order to benefit from the many advantages of cloud-based computing, such as essentially unlimited scalability, high availability, proven security, ease of management and the like. In order to facilitate such migrations, while minimizing the effort and resources required, routing protocol processing intermediaries (RPPIs) can be configured within a VCS in response to programmatic requests from the application owners. The RPPIs can establish communication sessions of dynamic routing information exchange protocols selected by the application owners with application pipeline components running at VCS resources such as compute instances or virtual machines. The application pipeline components can then transmit routing update messages to the RPPIs during the sessions, containing reachability information for the components formatted according to the dynamic routing information exchange protocols. Such reachability information messages may inform recipients about available next hops which can be used to forward messages containing requests for functions executed at a given application pipeline component. The messages containing the function requests may indicate an application-specific network address (chosen for example by the owner of the application from a private address range of an isolated virtual network at which the application components run, and different from the network addresses of the compute instances at which the application components run) as their destination address. The contents of the routing update messages can be analyzed by the RPPIs, and the RPPIs can invoke various APIs of the VCS (including, for example, APIs to obtain the needed information about provider-network-specific constructs such as VNIs) to cause route table entries to be updated if needed, without requiring the application pipeline components to themselves utilize the VCS APIs. In effect the RPPIs can act as logical bridges between the dynamic routing protocol-based model utilized traditionally for managing routing for components of various application pipelines, and the API-based model used for managing routing within the provider network.

As one skilled in the art will appreciate in light of this disclosure, certain embodiments may be capable of achieving various advantages, including some or all of the following: (a) reducing the amount of computing and other resources needed to migrate various types of applications to cloud computing environments, and (b) enhancing the user experience of administrators of such applications, e.g., by reducing requirements for administrator-requested route table updates, providing metrics pertaining to automated routing changes via the same types of easy-to-use interfaces and tools used for other metrics collected at provider networks, and the like.

In some embodiments in which the dynamic routing information exchange protocol being employed is a variant of BGP, RPPIs set up at VCSs can be referred to as BGP gateways. Application pipeline components which communicate with the RPPIs can be referred to as network function executors (NFEs), application pipeline function executors (APFEs), or simply as network function programs in various embodiments. Such application pipeline components may be responsible for implementing various types of virtualized network functions such as functions of centralized units (CUs), user plane functions (UPF) and/or other 5G Core (5GC) layers of the 5G application stack in some embodiments. Note that while communication applications are the primary examples of applications described herein that can benefit from RPPIs, RPPIs may be configured for other types of applications in various embodiments, and the techniques described herein are not limited to any particular type of application. Some APFEs that communicate with the RPPIs to provide or obtain reachability information may also or instead comprise appliances that perform tasks such as intrusion detection, load balancing and the like.

A network function is a functional building block within a network infrastructure, which has well-defined external interfaces and a well-defined functional behavior. Network functions can for example be chained together to form communications services or applications, such as public or private 5G data or voice applications, IoT (Internet of Things) applications, and the like. Network functions have historically been implemented as a physical network appliance or node; however, network functions can be virtualized as well. The core and RAN (radio access network) network functions referenced herein as examples of application components that benefit from the use of RPPIs can be based at least partly on the 3rd Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the Internet and back. According to the present disclosure, at least some network functions can additionally or alternatively be run on compute instances provisioned by a cloud provider, for example an edge device provisioned to a customer to implement a private 5G network. The terms "radio-based application" and "communication application" are used herein to refer to applications in which at least some messages are transmitted using radio frequency signals and associated antennas, such as those used for various generations (4G, 5G and the like) of cellular broadband technologies. Note that the techniques described herein are not limited for use to facilitate network functions of any particular generation of cellular broadband, nor are they limited to applications that utilize any particular portion of the electromagnetic spectrum for message transmissions.

In at least some embodiments, at least some route table entries at a VCS may indicate identifiers of virtual network interfaces as destinations. VNIs are logical devices managed by the VCS and mapped to physical network interfaces by the VCS to enable network connectivity for VCS compute instances or virtual machines. VNIs (which can also be referred to as "elastic network interfaces" or ENIs) enable various networking-related attributes such as IP (Internet Protocol) addresses and/or security settings governing egress or ingress of messages to be transferred relatively easily between compute instances without necessarily reconfiguring physical network cards. Such attribute transfers can be accomplished by detaching a VNI programmatically from one compute instance and attaching it programmatically to another compute instance, independent of the specific hardware network interface cards (NICs) of the host at which the compute instances run. Application pipeline function executors or network function executors may be run at compute instances to which one or more VNIs are programmatically attached in various embodiments, and the compute instances may be configured with addresses within isolated virtual networks or IVNs. An IVN (also referred to as a virtual private cloud) may comprise a collection of networked resources (including compute instances) allocated to a given VCS client such as an owner of a radio-based application, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client (and assigned to the appropriate VNIs) without having to consider the possibility that other resources within other IVNs may have been assigned the same IP addresses, subnets of the client's choice may be established within the IVN, security rules may be set up by the client for incoming and outgoing traffic with respect to the IVN, and so on.

According to some embodiments, a system may comprise one or more control plane servers (CPSs) and one or more routing protocol processing intermediaries launched at one or more data plane servers (DPSs) of a VCS of a provider network. Control plane resources may be responsible for primarily for administrative operations (such as provisioning data plane resources, managing availability and performance of the underlying physical network used for the VCS, etc.), while data plane resources may be used primarily for executing applications and storing/transmitting application data of clients of the provider VCS. A CPS may be configured to launch or establish a routing protocol processing intermediary (RPPI) at a selected DPS in various embodiments, and assign the RPPI a network address within an IVN established at the VCS. In at least some embodiments, the RPPI may be launched in response to one or more programmatic requests from a client of the VCS, such as an owner/vendor of a communication application. In some embodiments, the RPPI may for example comprise one or more processes or threads running at a compute instance.

The RPPI may be configured to establish (or participate in establishment of) a communication session of a dynamic routing information exchange protocol (such as a version or variant of BGP) with a network function executor (NFE) of a radio-based communication application in various embodiments. The NFE may be implemented at least in part using a compute instance with another network address (different from the network address of the RPPI) within the same IVN as the RPPI in at least one embodiment. For example, the NFE may comprise one or more processes or threads of execution running at the compute instance. In at least some embodiments, the NFE may include communication application logic implemented by a VCS client (the owner, designer or developer of the communication application). The RPPI may obtain, during the communication session, a routing update message formatted according to the dynamic routing information exchange protocol from the NFE. The routing update message may comprise reachability information of the network function executor. For example, the routing update message may indicate that requests for certain types of network functions can be directed to the IP address of the compute instance at which the NFE runs. The RPPI may examine and analyze the contents of the routing update message (e.g., in accordance with the dynamic routing information exchange protocol), and determine whether any changes to one or more routing tables of the IVN (or routing tables maintained elsewhere in the VCS) are needed. If the RPPI determines that such a change is required, in at least some embodiments, the RPPI may invoke a programmatic interface (e.g., an API) of the VCS to insert an entry into a route table of the VCS. The entry may indicate a VNI associated with the NFE (e.g., a VNI attached to the compute instance at which the NFE runs) as a destination. Subsequent to invocation of the programmatic interface, a network function for which a request is directed to the VNI using the entry may be performed at the NFE in various embodiments.

According to at least some embodiments, the routing update message sent by the NFE to the RPPI may indicate an IP address of the compute instance at which the NFE runs. In order to populate the route table entry, the RPPI may require the corresponding VNI identifier (i.e., the identifier of the VNI attached to the compute instance, to which the IP address is assigned). Such a VNI identifier may be obtained at the RPPI by invoking another programmatic interface or API of the VCS in various embodiments.

An RPPI may cause updates to route tables at more than one IVN in some embodiments. For example, other components of the communication application of which the NFE is a part may be implemented at other IVNs, and the RPPI may cause entries to be added to route tables at the other IVNs by invoking VCS APIs and/or by communicating with RPPIs set up at the other IVNs. In various embodiments, at least part of the traffic of the communication application may originate at resources external to the provider network, e.g., at communication application components (such as distributed units or DUs of the 5G stack) running at external premises managed or owned by the communication application owner or vendor. In one such embodiment, the RPPI may be responsible for propagating or transmitting at least a portion of contents of the routing update messages it receives from the NFE to protocol processors (such as BGP processing engines) at such external premises and/or to protocol processors of the public Internet. In various embodiments, various metrics associated with the dynamic routing information exchange protocol and/or the operations of the RPPI may be collected at the VCS, and presented to VCS clients such as the communication application owners via programmatic interfaces upon request. Such metrics may, for example, include counts of messages transmitted from various NFEs to the RPPIs during various time intervals, the number of route table entries updates/created as a result of such messages, the number of times an NFE or APFE failure was detected by an RPPI using the dynamic routing information exchange protocol, and so on.

In at least some embodiments, as indicated above, a VCS may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability. In some embodiments, a set of RPPIs and APFEs may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances for APFEs and/or RPPIs) from the control plane servers of the VCS (which remain at provider network data centers) to the extension location data plane servers in various embodiments.

The cloud provider network may implement various computing resources or services, which may include, in addition to a virtualized compute service (VCS), data processing service(s) (e.g., map reduce, data flow, and/or other large scale data processing techniques), data storage services (e.g., object storage services, block-based storage services, or data warehouse storage services), packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. In some embodiments, an RPPI and/or an APFE may be run within a software container managed using the container orchestration and management service. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which routing protocol processing intermediaries may be configured for communication application pipeline components executed using provider network resources, according to at least some embodiments. As shown, system 100 of FIG. 1 comprises resources and artifacts of a virtualized computing service (VCS) 110 of a provider network 102. The VCS may include control plane servers 120 and a collection of isolated virtual networks (IVNs) set up on behalf of clients of the VCS, including owners/vendors/administrators of various types of applications. The VCS may implement a set of programmatic interfaces 121, such as web-based consoles, command-line tools, APIs, graphical user interfaces and the like, which may be used by VCS clients to submit requests pertaining to VCS resources (such as requests to launch or terminate compute instances) and receive corresponding responses. Such requests may be submitted from a variety of client devices 180, such as desktops, laptops, mobile computing devices and the like in various embodiments.

The control plane servers 120 may for example include compute instance lifecycle managers 161, availability managers 162, metrics collectors 163, routing protocol processing intermediary (RPPI) fleet managers 164 and IVN networking managers 165 in the depicted embodiment. Compute instance lifecycle managers 161 may for example orchestrate the workflows for launching, migrating and/or terminating compute instances. Availability managers 162 may keep track of the health state of data plane servers (such as virtualization hosts at which compute instances are run) and networking components of the VCS, e.g., using metrics obtained from various portions of the VCS by metrics collectors 163, and initiate operations such as failovers as needed. RPPI fleet managers 164 may be responsible for configuring routing protocol processing intermediaries RPPIs in response to client requests, automatically scaling up or down the number of RPPIs configured within a given IVN based on analysis of metrics collected from the RPPIs, and so on in the depicted embodiment. IVN networking managers 165 may, for example, respond to programmatic requests from VCS clients and RPPIs for adding or removing entries from IVN route tables by implementing the requested changes in various embodiments.

In the example scenario depicted in FIG. 1, IVNs 125A and 125B may be established by the VCS control pane on behalf of a VCS clients. IVN 125A may, for example, be established on behalf of a client C1, while IVN 125B may be established on behalf of a different client C2. In some cases, multiple IVNs may be set up for the same client, e.g., to implement respective sets of applications. A given IVN may comprise one or more compute instances (CIs) 150 in the depicted embodiment, such as CI 150A in IVN 125A and CIs 150B and 150C in IVN 125B. A CI may comprise a virtual machine launched at a virtualization host with one or more physical network interfaces in some implementations. Network addresses, such as one or more Internet Protocol version 4 (IPv4) and/or IP version 6 (IPv6) addresses, may be assigned to CIs in the following manner in various embodiments. At least one virtual network interface (VNI) may be programmatically attached to a given CI, and an IP address may be assigned to the VNI (either before or after the programmatic attachment). Each VNI may be assigned a unique identifier by the VCS in some embodiments. To direct packets to/from CIs, the address(es) assigned to an attached VNI of the CI may be used as the destination/source IP addresses for the packets. IVN networking managers may create and maintain respective sets of one or more route tables for each IVN, such as IVN route tables 151A for IVN 125A and IVN route tables 151B for IVN 125B. In some embodiments, respective sets of route tables may be maintained for each subnet of an IVN. Mappings between VNIs and the physical network interfaces of the virtualization hosts may also be maintained by the VCS control plane servers in various embodiments. An encapsulation protocol may be implemented at the VCS to enable transmission of packets using CI IP addresses over the underlying physical network (also referred to as a substrate network) within which IP addresses of the physical network interfaces are used in the depicted embodiment. In at least some embodiments, a given entry stored within the IVN route tables 151 may indicate an identifier of a particular VNI which should be used as the next hop for a given destination IP address. Programmatic interfaces such as APIs implemented by the VCS control plane for adding/modifying route table entries of the IVNs may thus require information about VNIs in such embodiments.

In the example scenario of FIG. 1, client C1 may wish to utilize IVN 125A to run a portion of a multi-stage communication application pipeline, such as a pipeline of a 5G application. Compute instance 150A may be launched within IVN 150A (e.g., an IP address of an address range associated with IVN 125A may be assigned to a VNI attached to CI 150A) at the client's request. In response to a programmatic request from client C1, the VCS control plane may launch/establish RPPI 174A within IVN 125A. In some implementations, a special purpose CI (which is not to be used for running client application code) may be launched within IVN 125A and the RPPI 174A may comprise one or more processes/threads running within that special purpose CI. RPPI 174A may be configured to receive messages formatted according to a dynamic routing information exchange protocol DRP1 (such as a version of BGP, in which case RPPI 174A may be referred to as a BGP gateway) which various components of the communication application are designed to use to provide reachability information about themselves.

The client may utilize CI 150A to run an application pipeline function executor (APFE) 173A in the example scenario of FIG. 1. APFE 173A may, for example, implement part or all of the logic of one or more network functions of a centralized unit (CU) of a 5G application and/or network functions of other layers of a 5G application. A communication session of DRP1 may be established between the APFE 173A and the RPPI 174A in the depicted embodiment. To establish the session, parameters such as the IP addresses of each session participant and/or an autonomous system (AS) identifier used in the case where DRP1 is a BGP variant may be provided to the session participants, e.g., by the VCS control plane and/or the client C1. As part of the session, APFE 173A may send a sequence of DRP1 messages to RPPI 174A to provide reachability information regarding the functions implemented by APFE in the depicted embodiment. Such reachability information messages 144 may, for example, be sent periodically from the APFE in accordance with DRP1, and a recipient of the messages (such as an RPPI 174) may be responsible for examining whether any action needs to be taken based on the content of the received messages. A set of IP addresses represented as a CIDR (Classless Inter-Domain Routing) block CIDRBlock1 (which does not include the IP address IP1 of CI 150A's VNI) may be chosen by the client C1 as destinations for sending requests for functions implemented by APFE 173A in some implementations, and APFE 173A may transmit BGP routing update messages to RPPI 174A indicating that CIDRBlock1 addresses can be reached by sending packets to IP1.

RPPI 174A may analyze the contents of a DRP1 message received from APFE 173A and determine whether any entries should be added to and/or removed from IVN route tables 151A in the depicted embodiment. Depending on DRP1, it may for example be the case that multiple messages repeating the same reachability information may be received at RPPI 174A, and only a subset of the DRP1 messages may require an update to the IVN route tables. If, based on its analysis of a message received from APFE 173A, RPPI 174A makes a determination that a route table entry needs to be added or removed, RPPI 174A may invoke one or more VCS networking APIs to cause the desired route table change(s) in the depicted embodiment. Such VCS API-based updates 145 of the IVN route tables 151A may in some cases be less frequent than the reachability information messages 144. In at least one embodiment, the reachability information provided in the DRP1 messages may be expressed using the IP address IP1 of CI 150A, and the RPPI 174A may first use a VCS networking API to obtain the VNI identifier corresponding to the IP address IP1, and then use another VCS networking API to cause an entry containing that VNI identifier to be inserted into a route table. After a route table entry indicating reachability information for the functions performed at APFE 173A has been inserted into the appropriate route table, when a request for such a function is received at or within the IVN, the entry may be used to route the request to APFE 173A, and the requested function may be executed there in the depicted embodiment.

In some embodiments, several different RPPIs may be established within a given IVN. For example, in IVN 125B, which includes APFEs 173B (at CI 150B) and 173C (at CI 150C) of client C2's application pipeline, RPPIs 174B and 174C may be launched. Such multiple-RPPI configurations may be used, for example, for performance reasons (e.g., if the rate at which dynamic routing protocol messages are generated by APFEs in the IVN is very high), for availability reasons, and so on. Messages containing reachability information formatted in accordance with a dynamic routing information exchange protocol (which may for example differ from the protocol used in IVN 125A by APFE 173A) may be sent from APFEs 173B and 173C to one or more of the RPPIs 174A or 174B in the depicted embodiment. The RPPIs may analyze the messages and cause entries in IVN route tables 151B to be updated/inserted if needed in the depicted embodiment.

In at least one embodiment, the RPPIs within a given IVN may cause changes to route tables not just within that IVN, but also in other IVNs or in networks external to the provider network. For example, reachability information pertaining to APFE 173A may be propagated to other IVNs at which other portions of the same application are implemented, and/or to networking devices within client C1's external networks.

Figure 2:
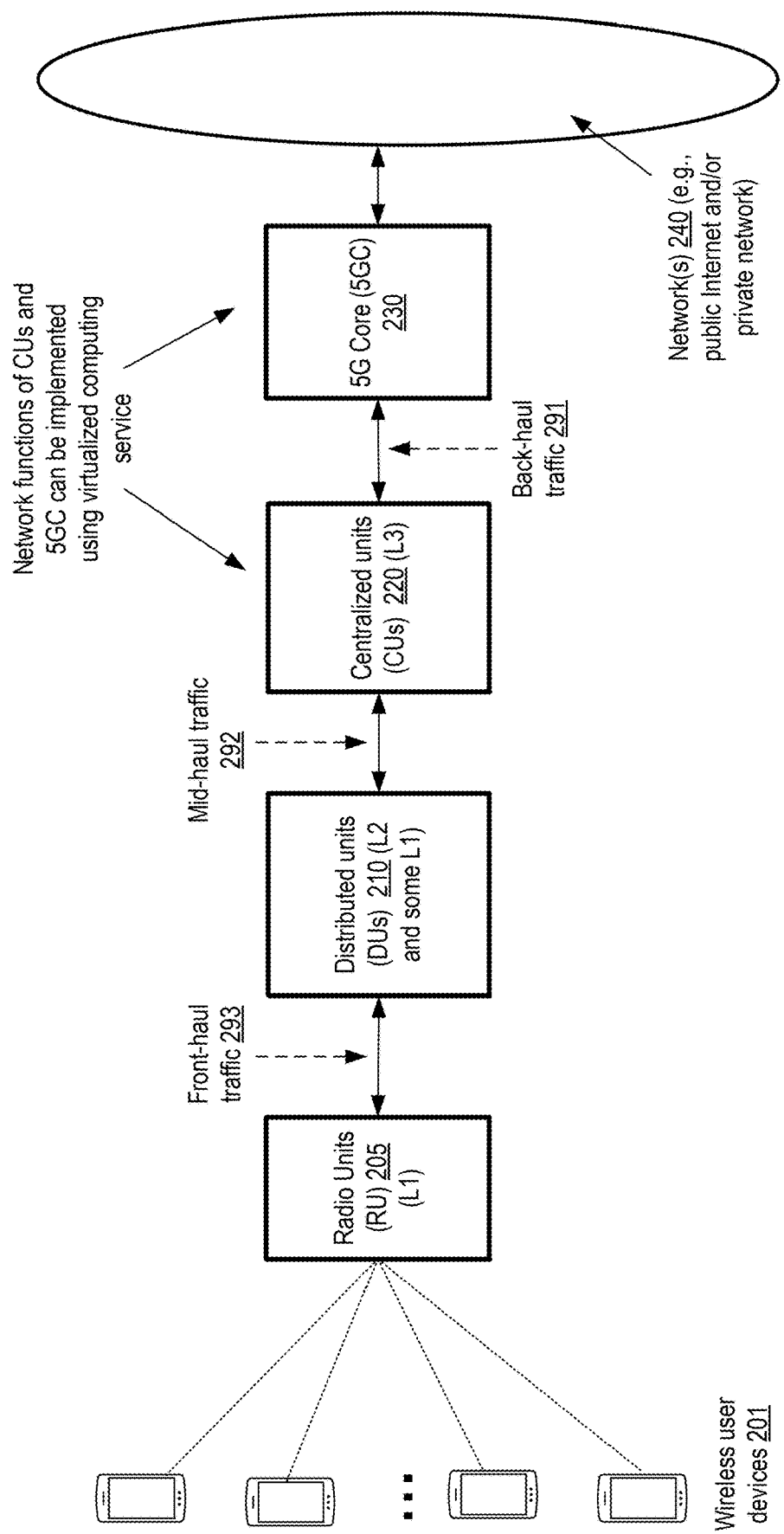
FIG. 2 illustrates components of an example telecommunication application technology stack, a subset of which may be implemented using resources of a provider network, according to at least some embodiments.

FIG. 2 illustrates components of an example telecommunication application technology stack, a subset of which may be implemented using resources of a provider network, according to at least some embodiments. The depicted components conform to a 5G-NR (fifth generation-new radio) standard published by 3GPP (Third Generation Partnership Project), a group of organizations responsible for defining protocols for mobile communications; similar layers are also defined for other generations of cellular communication technology. The 5G-NR protocol stack comprises three layers, referred to as L1 (layer 1), L2 (layer 2) and L3 (layer 3), as well as a core layer referred to as 5G Core or 5GC. In the pipeline of tasks of a communication application, L1 is the layer closest to end user equipment such as wireless user devices 201, and 5GC is the layer closest to the Internet or other network being used for transmitting user data and voice. Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. In a manner somewhat analogous to the subdivision, discussed above, of provider network functionality into control plane and data plane functionality, the operations needed for telecommunication applications may also be divided into control plane operations and user plane operations. Control plane operations include connection configuration and other administrative tasks such as monitoring, while user plane operations involve transmission of user data using Internet Protocol (IP) packets.

Logic for executing the functionality of the layers L1, L2 and L3 is distributed among three types of components: centralized units (CUs) 220 for L3 operations, distributed units (DUs) 210 used for L2 operations and optionally for some L1 operations, and radio units (RUs) 205 used for at least a subset of L1 operations. Each such unit may comprise its own pipeline of network function executors or programs in some embodiments. For example, respective network functions at the DUs in some embodiments may perform coding, rate matching, scrambling, modulation layer mapping, precoding, function, resource mapping, digital beamforming, Fast Fourier Transforms (FFTs), cyclic prefix insertion, cyclic prefix removal, inverse FFTs, de-mapping, channel estimation, pre-filtering, equalization, demodulation, descrambling, rate de-matching, and/or decoding. Traffic between the RUs and DUs may be referred to as front-haul traffic 293, traffic between the DUs and the CUs may be referred to as mid-haul traffic 292, and traffic between the CUs and the 5GC may be referred to as back-haul traffic 291. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). User plane operations may include quality of service (QOS) Management and Compression Integrity Ciphering in L2, Automatic Repeat Request (ARQ) processing and Hybrid ARQ (HARQ) processing in L2, and Channel Coding at the PHY layer. Control plane operations may include Non-access Stratum (NAS) protocol tasks, System Information (SI) tasks, paging, radio resource control (RRC) and compression integrity ciphering in L3, ARQ and HARQ in L2, and Channel Coding in the PHY layer. Network functions performed at the 5GC layer may for example include functions to aggregate data traffic from end user devices, authenticate subscribers, apply personalized policies, and/or manage the mobility of devices prior to routing traffic to networks 240 such as the Internet or private networks. 5GC may include various types of user plane functions (UPFs) in some embodiments. At least some of the components shown in FIG. 2 may execution respective sets of network functions, and hence may be referred to as network function executors of telecommunication application pipeline function executors. In at least some embodiments, at least a subset of the network functions of the CUs 220 and/or the 5GC 230 may be implemented using VCS compute instances and/or other provider network resources of the kind introduced above. In one embodiment, network functions of the other layers may also be implemented using provider network resources.

Traditionally, components of telecommunication applications (including earlier generations of radio-based applications that preceded 5G) have exchanged routing information using long-lasting communication sessions in which messages of dynamic routing information exchange protocols such as BGP are exchanged. In contrast, routing updates at a VCS similar to VCS 110 may typically require the invocation of VCS APIs rather than streams of messages, and the API parameters may in some cases require parameters providing information about provider network constructs such as virtual network interfaces. Vendors/owners of the telecommunication may wish to deploy the same code base for their application subcomponents (such as network function executors of the CU and 5GC layers) at resources within the VCS as they do at resources external to the provider network. Routing protocol processing intermediaries of the kind introduced above may be implemented to in effect act as translators between the BGP-based model of routing information transfer of traditional communication applications and the API-based model of the VCS in at least some embodiments.

Figure 3:
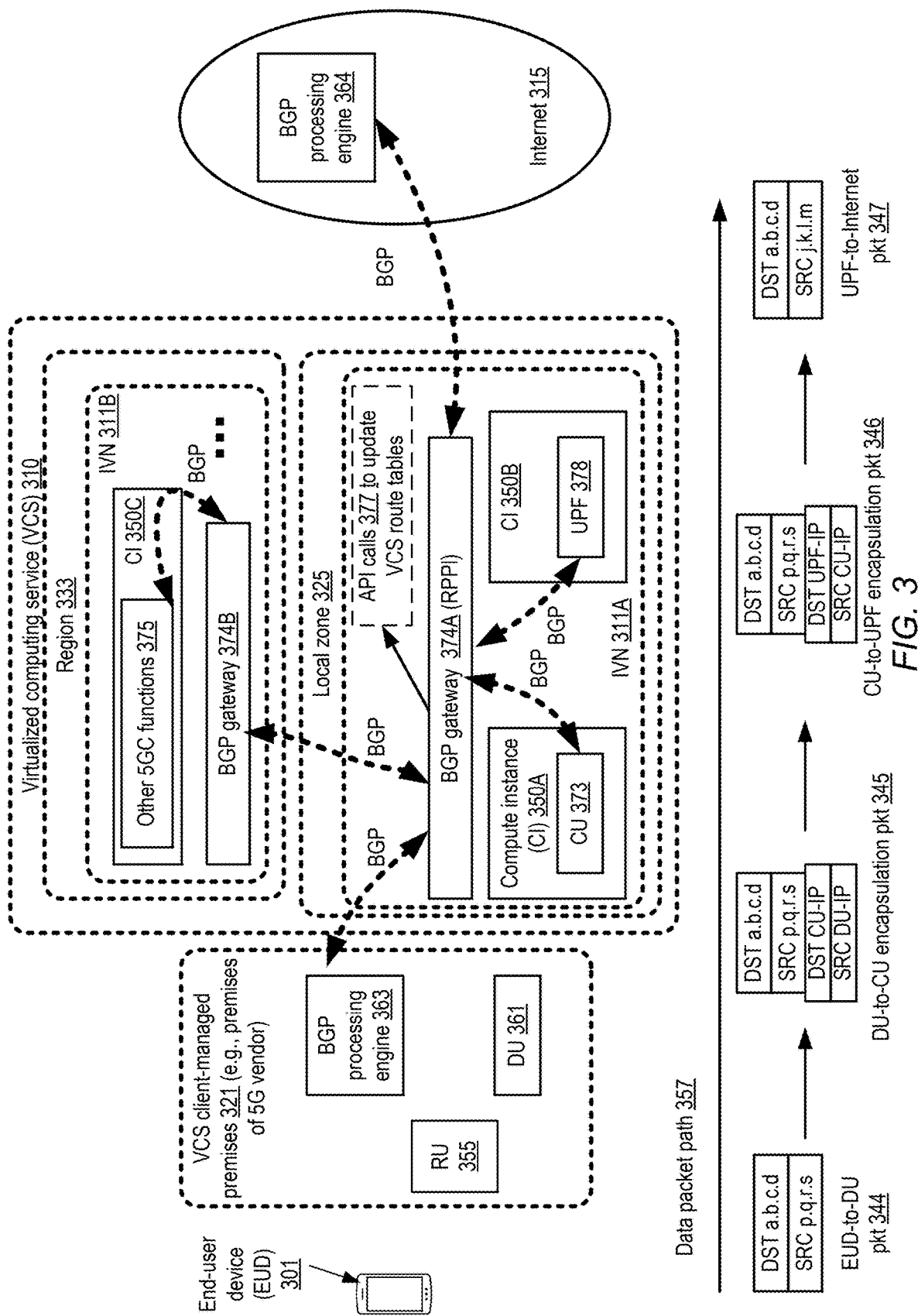
FIG. 3 illustrates examples of interactions between components of a communication application pipeline and a routing protocol processing intermediary, according to at least some embodiments.

FIG. 3 illustrates examples of interactions between components of a communication application pipeline and a routing protocol processing intermediary, according to at least some embodiments. At least some network functions of a centralized unit (CU) 373 are executed at a compute instance (CI) 350A launched at IVN 311A within a local zone 325 of a VCS 310 in the depicted example. Furthermore, at least some network functions of a user plane function (UPF) 378 such as UPF-D (UPF-data) are executed at another CI 350B launched at IVN 311A within the local zone. Recall that a local zone provides an extension of the cloud provider network substrate including a limited quantity of capacity provided outside of an availability zone (e.g., in a small data center or other facility owned/managed by the provider network operator which is located close to customer workload sources such as cell towers and that may be distant from any availability zones). The local zone facility or premise may be used for CU and the UPF due to proximity of the facility to VCS-client-managed premises 321 at which lower-layer components of the communication application such as RU 355 and DU 361 run in the depicted embodiment. Other components of the communication application, such as other 5GC functions 375 at CI 350C, may for example be run within large VCS data centers in a region 333 of the provider network in the depicted embodiment.

Data messages received at the RU 355 from an end-user device (EUD) 301 may be processed at an RU 355 and DU 361 before being sent on to the CU 373. At the other end of the telecommunication pipeline, IP packets containing the end user data may be sent via the Internet to their intended destination. In order for the requests for CU and UPF network functions which are executed using CIs 350A and 350B to be routed correctly, entries indicating the CU and UPF NFEs as destinations may be inserted via APIs in one or more route tables of the IVN 311A in the depicted embodiment. The CU and the UPF may advertise reachability information via BGP in the depicted embodiment to a BGP gateway 374A (an example of a routing protocol processing intermediary or RPPI) established by the VCS control plane within IVN 311A. The BGP gateway may examine contents of various routing update messages received from the CU and/or the UPF, and invoke VCS API calls 377 to cause the route tables to be updated if needed.

In addition to updating route tables within IVN 311A, the BGP gateway 374A may also provide routing information using BGP to one or more other destinations in the depicted embodiment. For example, information about reachability to a CU (which can be used to route CU function requests from DU 361) may be sent using BGP messages to one or more BGP processing engines 363 or other similar protocol processors at the VCS client's network, e.g., at computing devices within VCS-client managed premises. Furthermore, reachability information for the UPF 378 may be provided by the BGP gateway 364A to one or more BGP processing engines 364 of the public Internet 315; this may enable routing of packets flowing in the reverse direction (e.g., responses to packets sent from the EUD 301) in the depicted scenario. In at least some embodiments, just as the CU NFEs and UPF NFEs communicate with the BGP gateway 374A using BGP, other 5GC functions 375 may also use BGP to communicate with a second BGP gateway 374B which may be configured within IVN 311B at which the other 5GC functions run. BGP gateways 374A and 374B may also propagate BGP messages to one another in the depicted embodiment, and/or use VCS APIs to communicate with one another and cause changes to route tables in each other's IVNs.

Data packet path 357 illustrates the use of 5G encapsulation techniques along the inbound transmission of a data packet originating at the EUD 301 in the depicted embodiment. A data packet with a destination (DST) IP address a.b.c.d (intended for example for a web site) may be sent from EUD to the RU and then to the DU. The EUD-to-DU version of the data packet 344 may indicate p.q.r.s (an IP address assigned to the EUD, e.g., by the 5G application) as the source (SRC). An encapsulation packet 345 which contains the original EUD-to-DU packet may be created at the DU and sent to the CU in the depicted example. This DU-to-CU encapsulation packet 345 may indicate the CU's IP address CU-IP as the destination and the DU's IP address DU-IP as the source. Reachability to the CU-IP address may have been indicated in a BGP message sent from the CU 373 to the BGP gateway 374A and propagated from the BGP gateway to the external BGP processing engine 363. At the CU, reachability information about the UPF (sent by the UPF and translated into an IVN route table entry via an API invocation by the BGP gateway 374A) may be used to transmit a different encapsulation packet to the UPF. This second encapsulation packet 346 may also include the original EUD-to-DU packet 344 in the packet body, with the destination header set to UPF-IP (an IP address assigned for the UPF by the communication application) and source header set to CU-IP. The UPF may extract the contents of the encapsulated EUD-to-DU packet from the encapsulation packet 346 and send it on to the Internet in the form of UPF-to-Internet packet 347 in the depicted embodiment. The source IP address j.k.l.m of the UPF-to-Internet packet 347 may for example be an address chosen for the end user device's communication session from a range of public IP addresses managed by the UPF, enabling responses (if any) to the EUD's packet from the destination a.b.c.d to reach the correct UPF. The address j.k.l.m may be advertised by the UPF to the BGP gateway 374A as one of the destinations associated with the UPF, and the BGP gateway may propagate that address to the BGP processing engine 364 in the depicted embodiment in addition to updating IVN route tables via API invocations accordingly.

Figure 4:
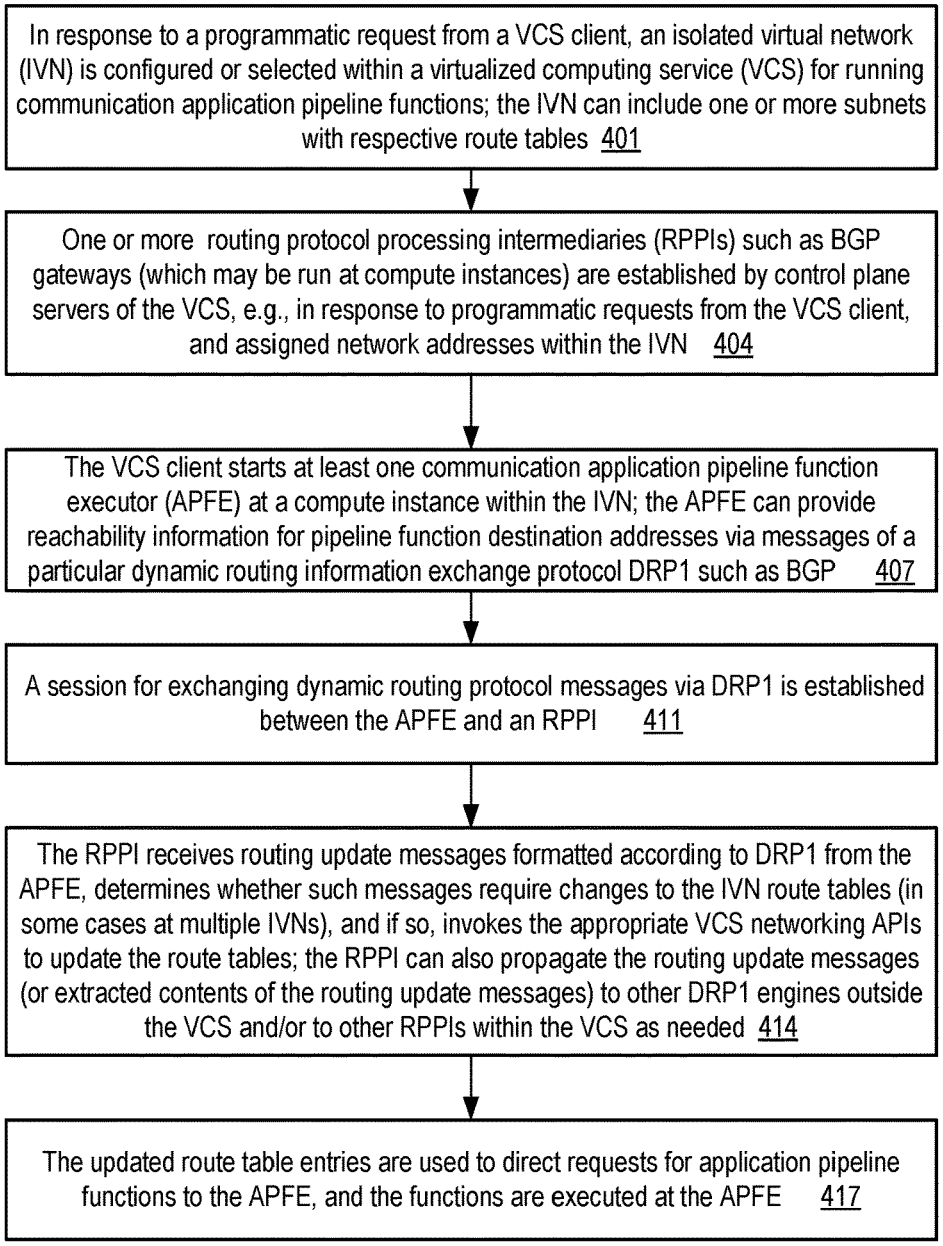
FIG. 4 is a flow diagram illustrating aspects of operations which may be performed to configure and utilize routing protocol processing intermediaries, according to at least some embodiments.

FIG. 4 is a flow diagram illustrating aspects of operations which may be performed to configure and utilize routing protocol processing intermediaries, according to at least some embodiments. As shown in element 401, an isolated virtual network (IVN) may be established or configured within a VCS for running communication application pipeline functions for a VCS client, e.g., in response to a programmatic request from the client. The IVN may include one or more subnets with respective route tables in some embodiments. In at least one embodiment, a pre-existing IVN which was established earlier for the client may be selected for running the functions.

One or more routing protocol processing intermediaries (RPPIs) such as BGP gateways may be established by control plane servers of the VCS in the depicted embodiment (element 404), e.g., in response to an additional programmatic request or requests from the VCS client. The RPPIs may be assigned respective network addresses within the IVN (e.g., addresses selected by the VCS control plane and/or the VCS client from a private address range of the IVN). As mentioned earlier, in some embodiments, an RPPI may include one or more executable threads or processes. In some implementations an RPPI may be run at a special-purpose compute instance launched by the VCS control plane, separate from the compute instances used to execute the network functions of the communication application. In other implementations, a non-virtualized server may be used to run the RPPI. In one implementation, an RPPI may be run at the same host as one or more compute instances at which application pipeline function executors of the VCS client are run. In another implementation, an RPPI may comprise a special purpose hardware device, such as a field-programmable gate array (FPGA) or a set of customized integrated circuits on a chip.

The VCS client may start at least one communication application pipeline function executor (APFE) at a compute instance such as a virtual machine within the IVN (element 407). The APFE may comprise executable code that can provide reachability information for a set of pipeline function destination addresses (addresses to which other components of the pipeline can send requests for function execution) via messages of a particular dynamic routing information exchange protocol DRP1 such as a version or variant of BGP in various embodiments. Note that at least in some cases, the compute instance at which the APFE runs may have its own IP address within the IVN's range of IP addresses, and this address may differ from the pipeline function destination addresses.

A communication session for exchanging dynamic routing protocol messages, such as BGP routing update messages or the like, may be established between the APFE and the RPPI in various embodiments (element 411). In order to establish the session, an IP address of the RPPI may be provided to the APFE, and/or an IP address of the APFE's compute instance may be provided to the RPPI in some implementations. The RPPI may begin receiving routing update messages, formatted according to DRP1, from the APFE in the depicted embodiment (element 414). Upon receiving such a message, the RPPI may analyze its contents and determine whether a corresponding change to one or more IVN route tables (at the same IVN at which the RPPI is configured, and/or at other IVNs) is needed. If any such changes are needed, the RPPI may invoke the appropriate VCS networking APIs to update the route tables, e.g., by adding or modifying one or more entries indicating that the APFE's compute instance should be used as a next hop for messages directed to the pipeline function destination addresses. The RPPI may also propagate the routing update message contents to other DRP1 processing engines outside the VCS in some embodiments, and/or to other RPPIs within the VCS as needed.

One or more of the route table entries updated/inserted as a result of the invocation of the VCS networking APIs may be used to route messages containing requests for the communication application pipeline functions to the APFE in various embodiments (element 417). The requested functions may then be performed/executed at the APFE, and the results of the functions may be sent to the appropriate destinations (such as other APFEs of the application), e.g., using route table entries which were also inserted/modified based on interactions of a different component of the communication application with one or more RPPIs in some embodiments.

Figure 5:
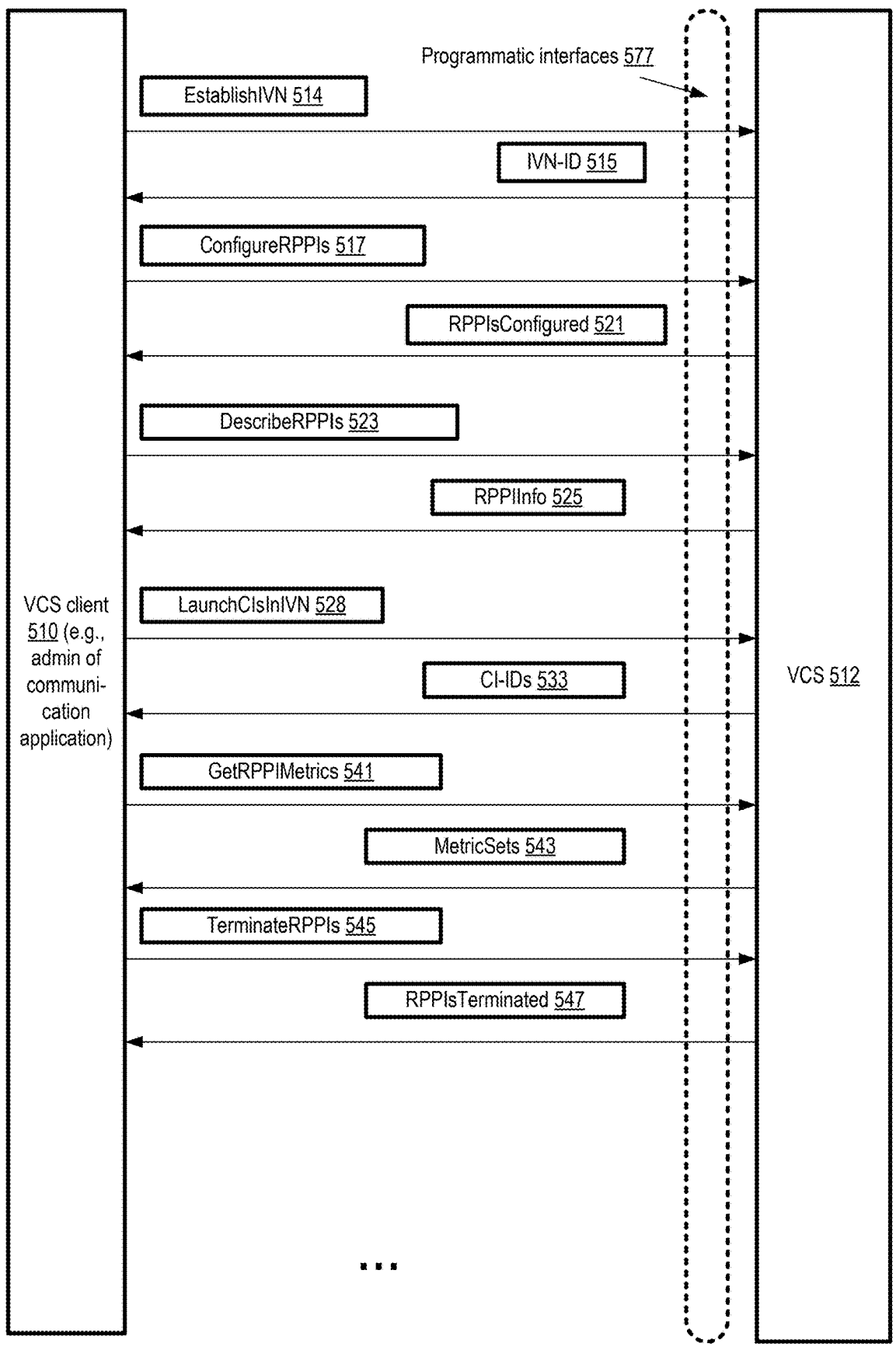
FIG. 5 illustrates example programmatic interactions related to the configuration and use of routing protocol processing intermediaries, according to at least some embodiments.

FIG. 5 illustrates example programmatic interactions related to the configuration and use of routing protocol processing intermediaries, according to at least some embodiments. A VCS 512, similar in features and functionality to VCS 110 of FIG. 1, may implement a set of programmatic interfaces 577 in the depicted embodiment. The programmatic interfaces may include, for example, one or more web-based consoles, command-line tools, APIs, and/or graphical user interfaces. The programmatic interfaces can be used by VCS clients 510 (such as administrators of communication applications) to submit requests and messages pertaining to the use of RPPIs of the kind introduced above, and receive corresponding responses in various embodiments.

A VCS client 510 may submit an EstablishIVN request 514 to the VCS via interfaces 577 in some embodiments, requesting the configuration of an IVN whose compute instances are to be used to execute functions of a communication application pipeline. An IVN may be established for the client, and an IVN-ID response message 515 comprising an identifier of the IVN may be provided to the client in some embodiments.

A ConfigureRPPIs request 517 may be submitted by the VCS client, requesting the instantiation or establishment of one or more RPPIs in the depicted embodiment. In response, the VCS 512 may configure the desired RPPIs (e.g., with each RPPI being run at a respective compute instance launched specifically for running an RPPI) and send an RPPIsConfigured message 521 to the client. As part of the configuration operations performed to set up an RPPI, a VCS control plane sever may assign a network address within a specified IVN to the RPPI (e.g., to a VNI attached to the compute instance at which the RPPI runs). In some cases, multiple RPPIs arranged in a high-availability configuration may be launched, as discussed below in further detail. In one implementation in which the RPPIs are configured to use BGP, the ConfigureRPPIs request's parameters for a given RPPI may include identifiers of the IVN and subnet within which the RPPI is to be configured, a BGP autonomous system (AS) which is going to be used by the APFE with which the RPPI is to establish a BGP session, the BGP IP address of the APFE, and/or a BGP authentication key for the session.

The VCS client 510 may submit a DescribeRPPIs request 523 to obtain information about the set of RPPIs established for the client in some embodiments. IN response, information such as the identifiers and health state of the RPPIs set up for the client, the IP addresses of the RPPIs, the subnets and IVNs in which the RPPIs are set up, may be provided in one or more RPPIInfo messages 525 in the depicted embodiment.

A set of one or more compute instances which are to be used for running application pipeline function executors (APFEs) of the client may be launched at the IVN in response to a LaunchCIsInIVN request 528 in the embodiment shown in FIG. 5. In some cases, the CIs and/or APFEs may be launched before the RPPIs are configured; in other cases, the CIs and/or APFEs may be launched after the RPPIs are configured. Identifiers of the launched compute instances may be provided to the client via one or more CI-IDs messages 533. In some embodiments, machine images which include the APFE code may be indicated in the request to launch the compute instances. In other embodiments, the VCS client may launch a compute instance using a machine image provided by the VCS, and later transfer programs implementing the communication application pipeline functions to the compute instances.

In at least some embodiments, a VCS client 510 on whose behalf one or more RPPIs have been configured may request metrics associated with the RPPIs via a GetRPPIMetrics message 541. In response, various metrics collected from or at the RPPIs may be provided to the client via one or more MetricsSets messages 543 in the depicted embodiment. Such metrics may include, for example, include counts of messages transmitted from various APFEs to the RPPIs during various time intervals, the number of route table entries updates/created as a result of such messages, the number of times an APFE failure was detected by an RPPI using the dynamic routing information exchange protocol (which may in turn have led to failover from one APFE to another) and so on.

A VCS client 510 may request the termination of one or more RPPIs by submitting a TerminateRPPIs request 545 in the depicted embodiment. In response, any communication sessions in which the specified RPPIs were participating may be terminated, and execution of the RPPIs may be ended in the depicted embodiment. An RPPIsTerminated message 547 may be sent to the client in at least some embodiments. It is noted that programmatic interactions pertaining to the use of RPPIs, other than those interactions shown in FIG. 5, may be supported by a VCS in at least some embodiments.

Figure 6:
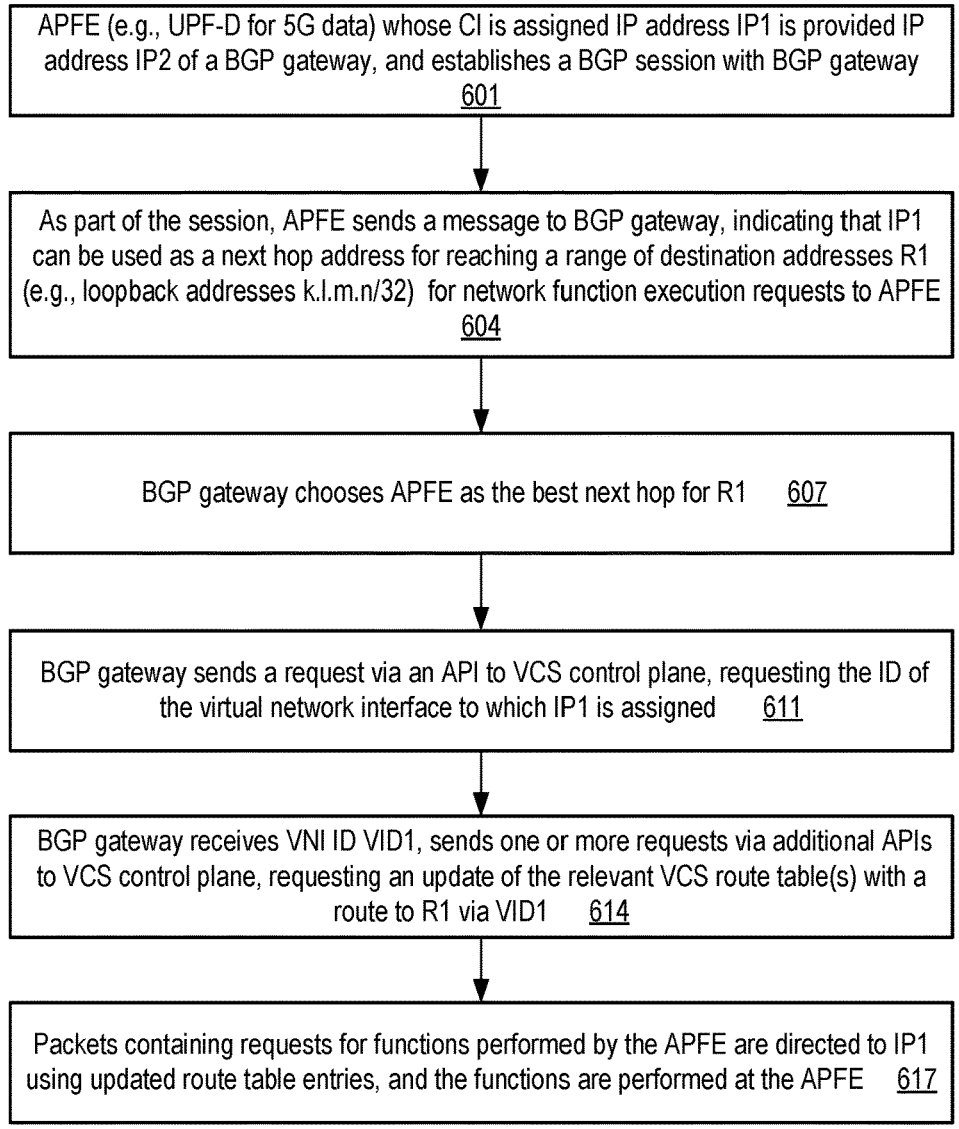
FIG. 6 is a flow diagram illustrating aspects of operations performed by a routing protocol processing intermediary in a scenario in which route table updates require virtual network interface identifiers, according to at least some embodiments.

FIG. 6 is a flow diagram illustrating aspects of operations performed by a routing protocol processing intermediary in a scenario in which route table updates require virtual network interface identifiers, according to at least some embodiments. Note that while BGP is used as the example dynamic routing information exchange protocol in FIG. 6 (as well as in FIG. 7), and a BGP gateway is used as the example RPPI, other protocols and/or other types of RPPIs may be employed in some embodiments. As shown in element 601, an application pipeline function executor (APFE), such as a UPF-D for a 5G data transfer application, run at a compute instance (CI) which is assigned an IP address IP1 may be provided an IP address IP2 of a BGP gateway. The APFE and the BGP gateway may establish a BGP session in various embodiments. The message flow for establishment of the BGP session may for example include setting up a TCP connection between the two participants (the BGP gateway and the APFE), followed by exchanging BGP control messages such as OPEN messages and KEEPALIVE messages over the TCP connection.

As part of the BGP session, the APFE may send a routing update message to the BGP gateway indicating that IP1 can be used as a next hop address for reaching a range of destination addresses R1 (e.g., loopback addresses k.l.m.n/32 in a scenario in which IP version 4 is being employed) for sending network function requests to the APFE (element 604). The destination address range may, for example, comprise a CIDR block chosen by the administrator of the communication application from a range of private network addresses of the IVN within which the APFE's CI is launched. Note that IP1 may not belong to the destination address range R1 in at least some embodiments.

The BGP gateway may comprise a BGP processing engine which runs eBGP (or some other appropriate BGP variant) and chooses the APFE as the best available next hop for packets directed to any of the addresses within range R1 in the depicted embodiment (element 607).

The BGP gateway may then send a request via an API invocation to the VCS control plane, requesting an identifier of the virtual network interface (VNI) (which is programmatically attached to the CI at which the APFE runs) whose IP address IP1 was provided in the routing update message sent by the APFE (element 611). The VNI's identifier may be required to construct the route table entry to be inserted in response to the determination that the APFE is the best next hop in the depicted embodiment—for example, the VNI's identifier may be entered as the destination field of the route table entry. In one implementation, to obtain the VNI identifier, the BGP gateway may invoke a DescribeVNI API whose parameter includes the IP address assigned to the VNI.

After the BGP gateway obtains or determines the VNI ID (VID1), the BGP gateway may invoke one or more additional VCS networking APIs to modify one or more IVN route tables in the depicted embodiment (element 614). For example, a CreateRoute API call may be invoked in one embodiment, with parameters specifying that VID1 is the destination for packets directed to the address range R1. After the route tables have been modified with the information pertaining to the APFE, packets containing requests for application functions to be performed by the APFE may be directed to IP1 in the depicted embodiment, and the requested operations/functions may be performed at the APFE (element 617).

Figure 7:
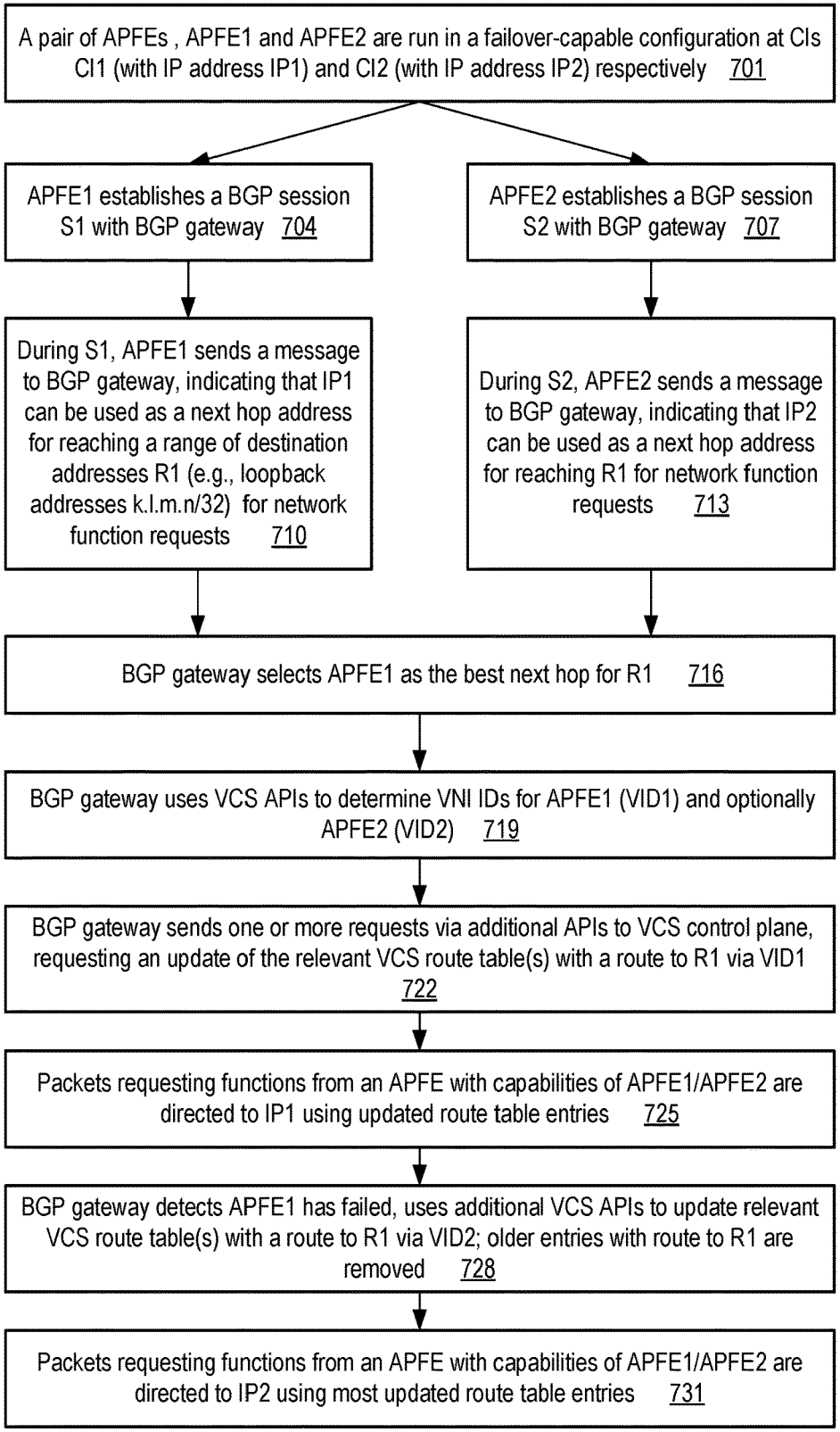
FIG. 7 is a flow diagram illustrating aspects of operations performed in a scenario in which a redundant pair of communication application pipeline components provides route updates to a routing protocol processing intermediary, according to at least some embodiments.

FIG. 7 is a flow diagram illustrating aspects of operations performed in a scenario in which a redundant pair of communication application pipeline components provides route updates to a routing protocol processing intermediary, according to at least some embodiments. A pair of APFEs, APFE1 and APFE2 are run in a failover-capable configuration in the depicted embodiment (element 701), e.g., within the same IVN. APFE1 may comprise one or more processes running at a compute instance CI1 with an IP address IP1, for example, while APFE2 may comprise one or more processes running at a different compute instance CI2 with an IP address IP2. Bothe APFEs may comprise code for running the same types of application functions (e.g., network functions of CU or UPFs of 5G applications).

Each of the APFEs may establish a respective BGP session with a BGP gateway established in their IVN. APFE1 may establish session S1 (element 704) while APFE2 may establish session S2 (element 707). During S1, APFE1 may send a route update message to the BGP gateway, indicating that IP1 can be used as the next hop address for reaching a range of destination addresses R1 (e.g., loopback addresses in CIDR block k.l.m.n/32) for network function requests (element 710). Similarly, APFE2 may send a route update message to the BGP gateway during S2 (element 713), indicating that APFE2's IP address IP2 can also be used as the next hop address for reaching the same range of destination addresses R2.

The BGP gateway may utilize eBGP (or some other BGP-based algorithm) to choose one of the APFEs, APFE1, as the best next hop for packets with destination addresses within R1 in the depicted embodiment (element 716). As such, in some embodiments the BGP gateway may select, from among multiple APFEs that each provide reachability information for the same type of application function (which can be executed at any one of the APFEs), a particular APFE which should be used as the next hop for at least some period of time for messages requesting that type of application function. The reachability information obtained from the non-selected APFEs may thus not be used to change contents of route table entries by the BGP gateway. In some cases, conflicting reachability information for a particular type of application function may be received at the BGP gateway from numerous sources, including some sources that do not necessarily implement the application function themselves. In general, the BGP gateway may select one destination from among the multiple destinations indicated in various conflicting messages pertaining to a given type of application function as the preferred next hop for requests for that type of application function. The BGP gateway may invoke VCS APIs (e.g., similar to the DescribeVNI API mentioned above) to obtain the VNI identifier for APFE1, VID1 (element 719). In some implementations, the BGP gateway may also obtain the VNI identifier VID2 for APFE2.

The BGP gateway may then invoke additional VCS APIs (such as the CreateRoute API mentioned above) to insert a route table entry indicating a route via VID1 to R1 (element 722). Packets containing requests for network functions that can be performed by APFEs with capabilities similar to APFE1 (or APFE2) may then be transmitted to APFE1's IP address IP1 using CI2's VNI using the route table entry inserted by the BGP gateway in the depicted embodiment (element 725).

At some point after the first route table entry indicating VID1 as the destination is added to the route table, the BGP gateway may determine (e.g., due to a sustained absence of BGP messages from APFE1) that APFE1 has failed or become unreachable (element 728). The BGP gateway may then use additional VCS APIs to update the relevant route tables with a new route (via VID2) to R1 in the depicted embodiment. The older entries which indicated VID1 as the destination VID for reaching R1 addresses may be deleted via VCCS APIs such as a DeleteRoute API in some embodiments. Packets containing requests for network functions that can be performed by APFEs with capabilities similar to APFE1 (or APFE2) may then be transmitted to APFE1's IP address IP2 via CI2's VNI using the latest route table entry inserted by the BGP gateway in the depicted embodiment (element 731).

It is noted that in various embodiments, some of the operations shown in the flow diagrams of FIG. 4, FIG. 6 and/or FIG. 7 may be implemented in a different order than that shown in the figure, or may be performed in parallel rather than sequentially. Additionally, some of the operations shown in FIG. 4, FIG. 6 and/or FIG. 7 may not be required in one or more implementations.

Figure 8:
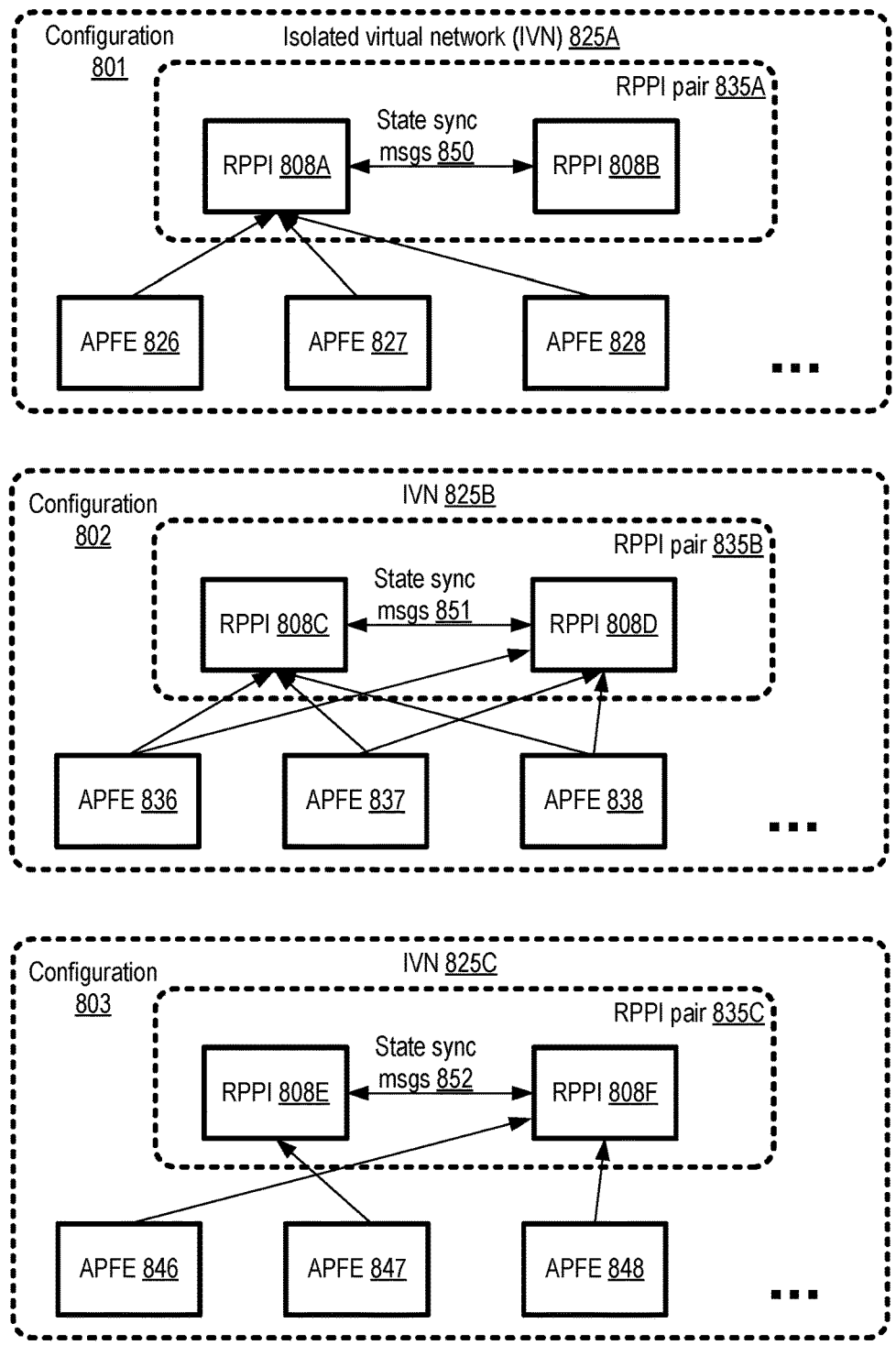
FIG. 8 illustrates example high-availability configurations of routing protocol processing intermediaries, according to at least some embodiments.

In some embodiments, instead of establishing a single RPPI within a given IVN at which function executors of an application are run using compute instances, multiple RPPIs may be established within the IVN for a higher degree of resilience to failure. FIG. 8 illustrates example high-availability configurations of routing protocol processing intermediaries, according to at least some embodiments. In general, high-availability RPPI configurations may differ from one another in the number of RPPIs established, the number of concurrent communication sessions established between APFEs and the RPPIs, whether one RPPI of the multiple RPPIs is designated as the primary or whether all the RPPIs are considered peers with no primary/non-primary role distinctions, and so on. In the examples shown in FIG. 8, two RPPIs are set up within a given subnet of a given RPI, but three or more RPIs may also be set up for even higher levels of availability in some embodiments.

In configuration 801, an RPPI pair 835A comprising RPPIs 808A and 808B is established within an IVN 825A. Several APFEs, such as APFEs 826, 827 and 828 (each of which may perform different sets of application functions) may be run within IVN 825A, e.g., at respective compute instances. RPPI 808A is designated as the primary RPPI in configuration 801, and each of the APFEs 826, 827 and 828 establishes a respective communication session to provide reachability information about destination address ranges for application functions to RPPI 808A. RPPI 808A may send state synchronization messages 850 to RPPI 808B in the depicted embodiment, to help ensure that RPPI 808B is able to take over the responsibilities of RPPI 808A in the event of a failure of RPPI 808A. The state synchronization messages 850 may, for example, comprise messages of the same dynamic routing information exchange protocol as the protocol used by the APFEs when communicating with RPPI 808A in some embodiments. In other embodiments, a different protocol may be used for synchronizing the reachability information available to both RPPIs. In one implementation, the primary RPPI 808A may forward copies of the messages it receives from the APFEs to the non-primary RPPI 808B.

In configuration 802, a pair 835B of RPPIs 808C and 808D may be set up within an IVN 825B which includes APFEs 836, 837 and 838 at respective compute instances. Instead of all the APFEs directing route update messages to a single RPPI as in configuration 801, each APFE may send its route update messages to each of the RPPIs of the pair 835B. The RPPIs may exchange state synchronization messages 851, e.g., to ensure that the reachability information of the APFEs remains consistent across both RPPIs even if some of the messages from the ADFEs happen to get dropped.

In configuration 803, a pair 835C of RPPIs 808E and 808F may be set up within an IVN 825C which includes APFEs 846, 847 and 848 at respective compute instances. In this case, each of the APFEs may choose a single RPPI with which a session of the dynamic routing information exchange protocol, but not all the APFEs may choose the same RPPI. For example, APFEs 846 and 848 have established respective communication sessions with RPPI 808F, while APFE 847 has established a communication session with RPPI 808E. The RPPIs may exchange state synchronization messages 852 to ensure that they both have consistent reachability information with respect to the APFEs.

Figure 9:
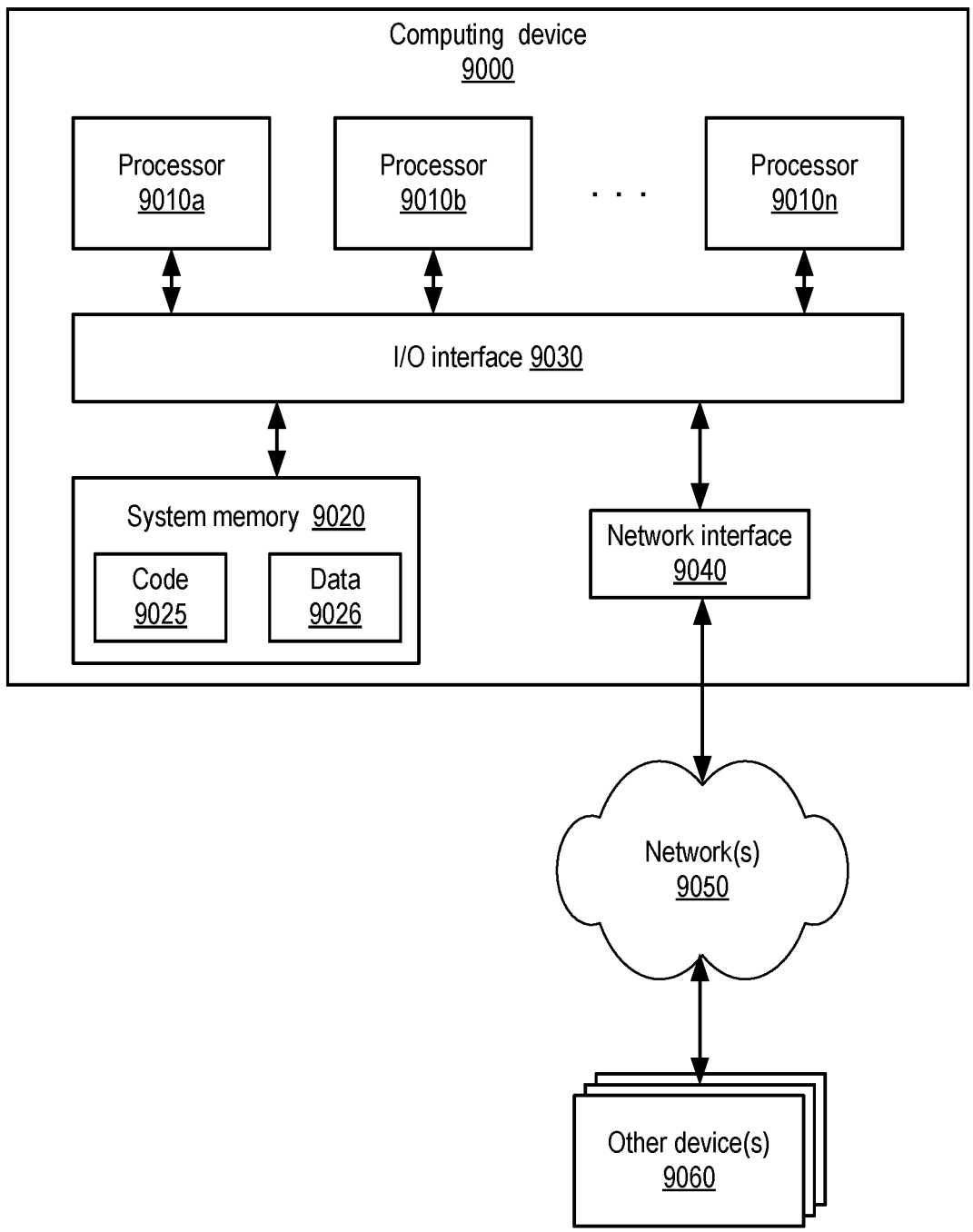
FIG. 9 is a block diagram illustrating an example computing device that may be used in at least some embodiments.

In at least some embodiments, a server that implements the types of techniques described herein (e.g., including VCS control plane functions, RPPI functions and/or virtualization host functions), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a virtualized computing service of a provider network; and
a routing protocol processing intermediary;
wherein the control plane server is configured to:
assign, to the routing protocol processing intermediary, a first network address within an isolated virtual network established at the virtualized computing service; and
wherein the routing protocol processing intermediary is configured to:
establish a communication session of a dynamic routing information exchange protocol with a network function executor of a radio-based communication application, wherein the network function executor is implemented at least in part using a compute instance with a second network address within the isolated virtual network;
obtain, via the communication session, a routing update message formatted according to the dynamic routing information exchange protocol from the network function executor, wherein the routing update message comprises reachability information of the network function executor; and
invoke, based at least in part on analysis of the routing update message, a programmatic interface of the virtualized computing service to insert an entry into a route table of the virtualized computing service, wherein the entry indicates a virtual network interface as a destination, wherein the virtual network interface is programmatically attached to the compute instance at which the network function executer is implemented, and wherein subsequent to invocation of the programmatic interface, a network function for which a request is directed to the virtual network interface using the entry is performed at the network function executor.

2. The system as recited in claim 1, wherein the dynamic routing information exchange protocol is a variant of BGP (Border Gateway Protocol).

3. The system as recited in claim 1, wherein the network function performed at the network function executor comprises a portion of one or more of: (a) a centralized unit (CU) of the radio-based communication application or (a) a user plane function (UPF) of the radio-based communication application.

4. The system as recited in claim 1, wherein the routing protocol processing intermediary is further configured to:
in response to obtaining another routing update message from the network function executor, determine that another route table entry corresponding to the other routing update message is not to be inserted into the route table.

5. The system as recited in claim 1, wherein the control plane server is further configured to:
obtain, via a programmatic interface from a client of the virtualized computing service, a request to establish a routing protocol processing intermediary, wherein the routing protocol processing intermediary is launched in response to the request.

6. A computer-implemented method, comprising:
establishing a communication session of a dynamic routing information exchange protocol between (a) a routing protocol processing intermediary configured within a virtualized computing service and (b) a network function executor of a communication application, wherein the network function executor is implemented at least in part using a first compute instance launched within the virtualized computing service;
obtaining, at the routing protocol processing intermediary during the communication session, a routing update message formatted according to a dynamic routing information exchange protocol from the network function executor, wherein the routing update message comprises reachability information of the network function executor; and
causing, by the routing protocol processing intermediary, based at least in part on contents of the routing update message, an entry to be stored in a first route table of the virtualized computing service, wherein the entry indicates a virtual network interface as a destination, wherein the virtual network interface is programmatically attached to the first compute instance at which the network function executer is implemented and wherein after the entry is stored, a network function for which a request is routed to the network function executor using the entry is performed at the network function executor.

7. The computer-implemented method as recited in claim 6, wherein the dynamic routing information exchange protocol is a variant of BGP (Border Gateway Protocol).

8. The computer-implemented method as recited in claim 6, wherein the network function performed at the network function executor comprises a function of one or more of: (a) a centralized unit (CU) of a radio-based communication application or (a) a user plane function (UPF) of a radio-based communication application.

9. The computer-implemented method as recited in claim 6, wherein causing the entry to be stored in the first route table comprises invoking, by the routing protocol processing intermediary, an application programming interface (API) of the virtualized computing service.

10. The computer-implemented method as recited in claim 6, further comprising:
establishing the routing protocol processing intermediary in response to a programmatic request directed to the virtualized computing service.

11. The computer-implemented method as recited in claim 6, further comprising:
invoking, by the routing protocol processing intermediary, an application programming interface (API) of the virtualized computing service to obtain an identifier of the virtual network interface which is programmatically attached to the compute instance; and
including, by the routing protocol processing intermediary, the identifier of the virtual network interface in the entry stored in the first route table.

12. The computer-implemented method as recited in claim 6, wherein the first route table is associated with a first isolated virtual network within which the network function executor is configured, the computer-implemented method further comprising:
causing, by the routing protocol processing intermediary, based at least in part on contents of the routing update message, a second route table to be modified, wherein the second route table is associated with a second isolated virtual network, wherein the second isolated virtual network comprises one or more additional network function executors of the communication application.

13. The computer-implemented method as recited in claim 6, wherein the routing protocol processing intermediary is executed at least in part at a second compute instance of the virtualized computing service.

14. The computer-implemented method as recited in claim 6, further comprising:
causing, by the routing protocol processing intermediary, at least a portion of contents of the routing update message to be propagated to a protocol processor external to a provider network at which the virtualized computing service is implemented.

15. The computer-implemented method as recited in claim 6, wherein the virtualized computing service is implemented at least in part at a provider network, the computer-implemented method further comprising:
obtaining, at the network function executor, another request for a network function, wherein the other request is routed to the network function executor from a source external to the provider network using contents of the routing update message which are propagated by the routing protocol processing intermediary to a destination external to the provider network.

16. A non-transitory computer-accessible storage medium storing program instructions that when executed a processor implement a routing protocol processing intermediary configured to:
establish a communication session of a dynamic routing information exchange protocol with a first application pipeline function executor, wherein the first application pipeline function executor is implemented at least in part within a virtualized computing service;
obtain, from the first application pipeline function executor during the communication session, a first routing update message formatted according to a dynamic routing information exchange protocol, wherein the first routing update message comprises reachability information for a particular application function implemented by the first application pipeline function executor; and
cause, based at least in part on contents of the first routing update message, an entry to be stored in a route table of the virtualized computing service, wherein the entry indicates a virtual network interface as a destination, wherein the virtual network interface is programmatically attached to a compute instance at which the first application pipeline function executor runs, and wherein after the entry is stored, a request for the particular application function is routed to the first application pipeline function executor using the entry.

17. The non-transitory computer-accessible storage medium as recited in claim 16, wherein the routing protocol processing intermediary is further configured to:
obtain, from a second application pipeline function executor, a second routing update message formatted according to the dynamic routing information exchange protocol, wherein the second routing update message comprises reachability information for the particular application function, wherein at least a portion of reachability information included in the first routing update message conflicts with reachability information included in the second routing update message; and
determine, based at least in part on analysis of the first routing update message and the second routing update message, that (a) the first application pipeline function executor is to be indicated as the destination in the entry stored in the route table and (b) the second application pipeline function executor is not to be indicated as the destination in the entry stored in the route table.

18. The non-transitory computer-accessible storage medium as recited in claim 16, wherein the particular application function comprises a portion of one or more of: (a) a centralized unit (CU) of a radio-based communication application or (a) a user plane function (UPF) of a radio-based communication application.

19. The non-transitory computer-accessible storage medium as recited in claim 16, wherein the routing protocol processing intermediary is further configured to:
invoke an application programming interface (API) of the virtualized computing service to obtain an identifier of the virtual network interface which is programmatically attached to the compute instance at which the first application pipeline function executor runs; and
include the identifier of the virtual network interface in the entry stored in the route table.

20. The non-transitory computer-accessible storage medium as recited in claim 16, wherein the routing protocol processing intermediary is further configured to:

cause one or more metrics collected during the communication session to be presented via a programmatic interface.

* * * * *